United States Patent [19]
Thomson et al.

[11] Patent Number: 5,903,615
[45] Date of Patent: May 11, 1999

[54] LOW COMPLEXITY FREQUENCY ESTIMATOR AND INTERFERENCE CANCELLATION METHOD AND DEVICE

[75] Inventors: Larry S. Thomson, Grass Valley; Carl H. Alelyunas, Nevada City, both of Calif.

[73] Assignee: 3COM Corporation, Santa Clara, Calif.

[21] Appl. No.: 09/087,626

[22] Filed: May 29, 1998

Related U.S. Application Data

[63] Continuation of application No. 09/050,736, Mar. 30, 1998.
[51] Int. Cl.$^6$ ...................................................... H04B 1/10
[52] U.S. Cl. ...................... 375/346; 375/229; 375/233; 365/73; 365/76
[58] Field of Search ................................. 375/343, 346, 375/207, 209, 225, 254, 278, 229, 233; 365/73, 76; 370/286, 288, 289, 332, 333

[56] References Cited

U.S. PATENT DOCUMENTS

| | | | |
|---|---|---|---|
| 4,589,083 | 5/1986 | Le Dinh et al. | 364/724 |
| 5,343,404 | 8/1994 | Girgis | 364/484 |
| 5,659,583 | 8/1997 | Lane | 375/346 |
| 5,694,437 | 12/1997 | Yang et al. | 375/346 |
| 5,740,206 | 4/1998 | Lomp et al. | 375/346 |
| 5,787,129 | 7/1998 | Willming | 375/346 |

*Primary Examiner*—Jason Chan
*Assistant Examiner*—Congvan Tran
*Attorney, Agent, or Firm*—McDonnell Boehnen Hulbert & Berghoff

[57] ABSTRACT

A method and apparatus for estimating the frequency of a periodic signal and for canceling the interference in a modem signal. Power line noise may interfere with electronic signals. Since power lines may be either 50 Hz or 60 Hz, depending on the country, frequency estimation of the periodic power line noise is necessary. Modem signals are received and autocorrelated in order to identify the periodic characteristics of the signal over time. Once the frequency is identified, the power line noise is modeled based on creating a circular buffer. Initially, the circular buffer is composed of scaled samples of one cycle of the fundamental frequency of the power line noise. Thereafter, samples are received, scaled, and combined with previous buffer values in order to update the buffer. In this manner, the buffer models the power line noise, so that the power line noise may be removed from the system.

32 Claims, 4 Drawing Sheets

LOW COMPLEXITY FREQUENCY ESTIMATOR AND INTERFERENCE CANCELLATION METHOD AND DEVICE

REFERENCE TO RELATED APPLICATION

This application is a continuing application of U.S. application Ser. No. 09/050,736, filed on Mar. 30, 1998, claiming priority benefits under 35 U.S.C. §120.

NOTICE REGARDING COPYRIGHT

A portion of the disclosure of this patent document contains matter subject to copyright protection. The copyright owner has no objection to the facsimile reproduction by anyone of the patent disclosure document as it appears in the Patent and Trademark Office files and records but otherwise retains all copyrights whatsoever.

BACKGROUND OF THE INVENTION

The present invention relates to noise detection and, more particularly, to estimation and cancellation of noise in a system or device.

Electronic signals are often composed of a desired signal and noise. The noise may be considered anything undesirable that is included in the electronic signal. At times, the noise may interfere with the interpretation of the desired signal within the electronic signal. In order to interpret the desired signal with greater accuracy, the noise should be removed from, or reduced in, the electronic signal without significantly degrading the desired signal.

One example of a device that receives an electronic signal is a modem. A modem typically modulates information for transmission over a communication channel and demodulates signals received from the communication channel to recover information. Noise may corrupt the modulated signal, thereby degrading the desired signal, thereby requiring the use of noise reduction techniques to recover the desired signal. Other devices which are sensitive to noise include medical devices such as EKG monitors, audio systems, and industrial devices. For example, even though an electronic device is internally well-buffered, such as in the case of an EKG monitor, external power line noise can filter into the system, interrupting the desired signal. As another example, where a machining device has motion control as part of its feedback, the motion control may experience interference from power line noise due to the harsh environment of the machining device.

Moreover, some devices use power lines as the medium by which to send data. The interference from the power line in that instance may significantly interfere with the data communication. Further, other types of electronic signals, such as video signals, may experience a "hum" due to power line noise. In the case where the video signal must be precise, the "hum" may interfere with the video.

Noise in a system may be either periodic or non-periodic. One source of periodic noise is the interference from AC power lines. Power line noise is commonly either 50 Hz or 60 Hz, depending on the power convention for the particular country. This type of noise may effect an electronic device in various ways. A high speed modem, for example, may suffer from periodic power line interference from one of several sources. There could be power line noise carried on the phone line to which the modem is connected. There could also be noise from an insufficiently filtered power supply for either the modem itself or the host computer to which the modem is attached.

There are various approaches to reduce noise, and in particular periodic noise, on a system. Two known approaches involve filtering the noise. First, a simple high pass filter may be used. The filter is designed to pass frequencies in the range of the desired signal and to block other frequencies. Thus, this approach may not require that the filter be designed specifically for a known frequency (such as in the power line example of 50 Hz or 60 Hz). In the alternative, a narrow notch filter may be designed if one has a priori knowledge of the frequency of the periodic interference. Both of these approaches may be useful if the frequency of the periodic noise does not fall within the range of the desired signal.

In those instances that require knowledge of the frequency of noise, a method and apparatus may be required for determining the frequency of an interfering periodic signal. Techniques exist which are known in the art for estimating frequencies of periodic signals on a communication channel. These techniques often involve generating a power density spectrum from a data sequence, and then analyzing the spectrum to identify peaks. While these techniques are useful for analysis of an arbitrary spectrum, they may require a large amount of computation. It is desirable to minimize the computational demands of the noise reduction technique. Another known approach is to filter the data sequence using narrow bandpass filters, with one filter centered at each frequency in question, and then compare the amplitudes of the filter outputs. This may be simpler than generating the complete spectrum, but a simpler approach is still desirable.

Once the frequency of the periodic noise is determined, the noise should be reduced or eliminated. In the power line example, desired signals (audio, data communications, etc.) are often corrupted by periodic interference such as from 50/60 Hz power line noise. Various techniques for removing the interference from the signal have been developed, such as high-pass filtering, notch filtering, and adaptive noise cancellation techniques. These techniques are often inadequate for a number of reasons. First, the interference often contains harmonics that exist in the same frequency range as the signal, in which case high-pass filtering is not sufficient. Second, the frequency of the interfering signal may not be known exactly, in which case a notch filter is not acceptable. Third, adaptive noise cancellation techniques typically require a reference which consists of the interference alone without the signal. In many cases, such a reference is unavailable. Fourth, the noise cancellation techniques often treat the periodic noise and the non-periodic desired signal in the same manner causing, in many instances, the desired signal to degrade when attempting to eliminate the noise within the system. For example, a notch filter, which is set at 60 Hz, treats the periodic noise and any desired signal component at 60 Hz equally, so that the desired signal may also be degraded.

A high speed modem is one example of a device that may suffer from periodic interference. Such interference will likely have harmonics throughout the frequency range of the modulated signal. As a further complication, the frequency of the periodic interference may be known approximately but not exactly. In addition, there will typically not be an interference reference available. Accordingly it is desirable to have an improved frequency estimator and interference cancellation method and apparatus.

SUMMARY OF THE INVENTION

In a first aspect of the invention, a method and apparatus is provided for identifying the frequency of a periodic signal within an electronic signal by treating the periodic signal as the primary signal and by treating the remaining portion of the electronic signal as background noise, uncorrelated with the periodic signal.

In a second aspect of the invention, a method and apparatus is provided for modeling and reducing periodic noise from an electronic signal. The periodic noise is treated as the primary signal and the remaining portion of the electronic signal is treated as background noise, uncorrelated with the periodic signal.

It is an object of the present invention to provide a method and apparatus for determining the frequency of a periodic signal.

It is a further object of the present invention to provide a method and apparatus for removing periodic interference, such as power line noise, from an electronic signal.

BRIEF DESCRIPTION OF THE DRAWINGS

FIG. 6b is a block diagram of the interference estimator as shown in FIG. 6a.

DETAILED DESCRIPTION OF THE PRESENTLY PREFERRED EMBODIMENTS

Identification of a periodic signal (or signal components at discrete frequencies) within an electronic signal is often an important task in analyzing the electronic signal. One example of a periodic signal is periodic noise. Periodic noise may come from a variety of sources, such as via a power line. For instances in which the desired signal is spectrally flat (i.e., the desired signal has frequency components randomly distributed across some range), the periodic noise can be analyzed differently than the desired signal. In this manner, the periodic noise may be identified and eliminated more accurately and efficiently.

Figure 1:
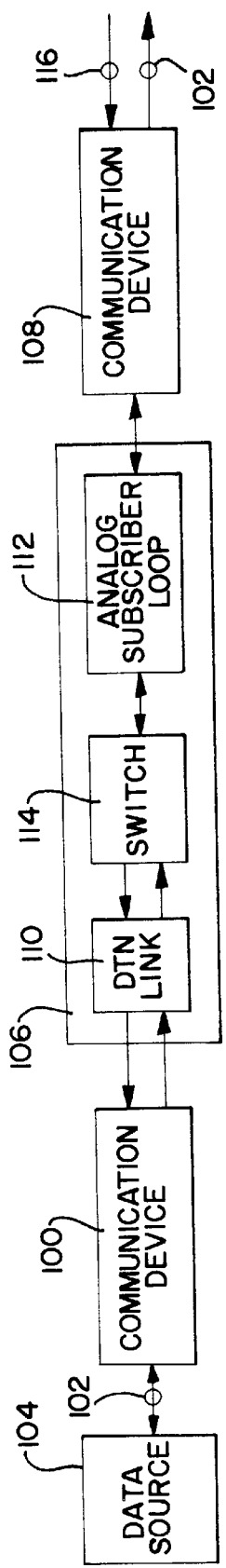
FIG. 1 is a schematic representation of a data communication system.

The presently preferred embodiments of the invention will now be described by reference to the accompanying figures, wherein like elements are referred to by like numerals. FIG. 1 is a schematic representation of a data communication system. A first data communications device 100 receives information 102 from a data source 104. The information 102 may be in either analog or digital form, although digital information is preferred for high speed data transfer applications. For instances in which the data communications device 100 receives information 102 from the data source 104 that is in analog form, the data communications device 100 may include an analog-to-digital converter that converts analog information 102 into digital form. Thus, the input to the communications device 100 may be in either analog or digital form, and the output of the communications device 100 is digital.

The first data communications device 100 is connected by a communication channel 106 to a second data communications device 108. The term modem may be used herein to refer to the data communications devices 100, 108. The communication channel 106 includes a digital telephone network ("DTN") link 110 that is coupled to an analog subscriber loop 112 by a local switch 114. The DTN 110 carries digital information in the form of pulse code modulated ("PCM") codewords, which are typically eight bits in length. The loop 112 carries an analog representation of the digital information. The local switch 114 acts as an interface between the DTN 110 and the loop 112 by converting digital information supplied by the DTN 110 into analog form for transmission over the loop 112 and converting analog signals supplied by the loop 112 into digital form for transmission over the DTN 110. The analog-to-digital and digital-to-analog conversions performed by the local switch 114 are well known conversions, such as the $\mu$-law conversion that is utilized in North America and Japan or the European A-law conversion.

In a high speed data communication system, the data communications devices 100 and 108 process received data samples at rates of thousands of samples per second. In addition, with respect to the data communications device 108, periodic noise may be introduced to the received data samples from the analog subscriber loop 112, a power supply within the data communications device 108, a power supply within a host computer (not shown) connected to the data communications device 108, or any combination of the above sources. The data communication system shown in FIG. 1 may be utilized to download data from the device 100 to the device 108 at a rate of up to 56,000 bits/second in accordance with ITU-T Recommendation V.90, the contents of which are incorporated herein.

In accordance with a preferred embodiment, the frequency identification or estimation is performed during start-up operation of the electronic device, and in particular, the data communications device. However, if it is expected that the periodic frequency may change during a session of operation, the frequency estimation may alternatively be performed in the midst of steady state operation. If one performs frequency estimation during steady state operation, at such sample rates, there may not be time to do numerically intensive frequency detection methods, in addition to all of the other processing that the modem must perform between samples. Where one only needs to distinguish between two or more discrete frequencies or where one wishes to identify the frequency of a periodic signal, the following approach may be utilized.

Figure 2:
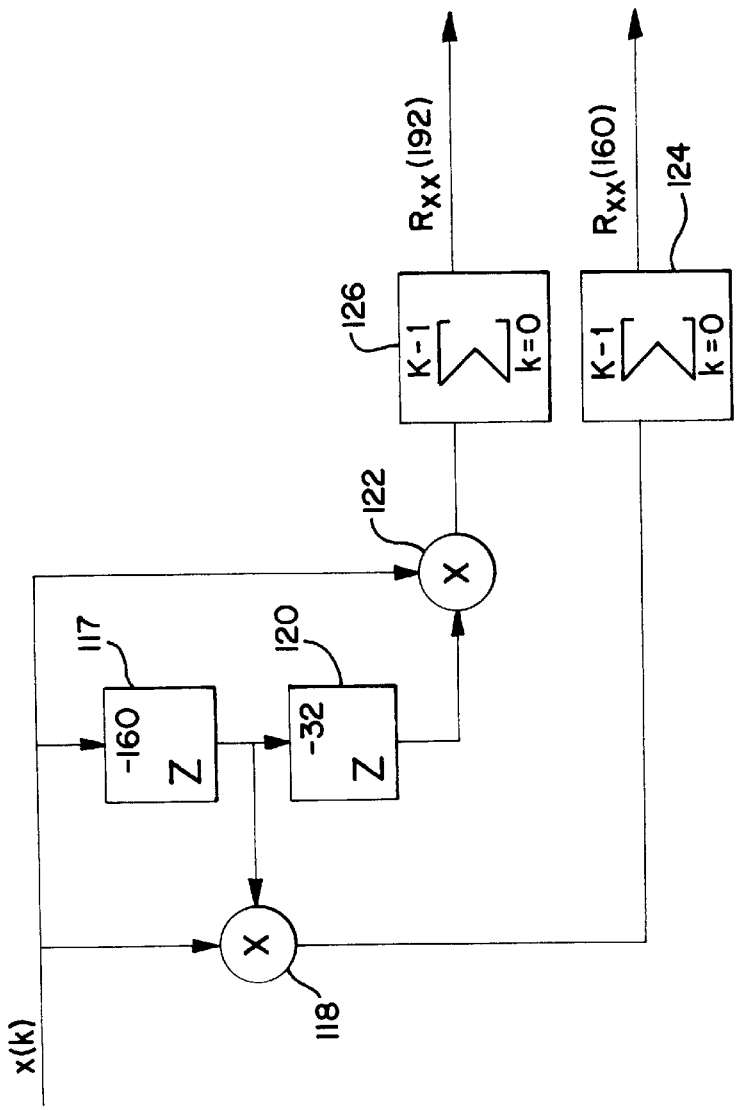
FIG. 2 is a block diagram of a frequency estimation system in accordance with a preferred embodiment of the present invention.

In order to improve the performance of the data communications device, periodic noise should be reduced. To accomplish this, a frequency estimator, as described with reference to FIG. 2, is used to estimate the frequency of the power line contributing to the noise. Moreover, an interference estimator, as described with reference to FIGS. 3 through 7, is used to model and reduce the noise contribution to the data communications signal. In accordance with a preferred embodiment, Appendix A includes source code for a frequency estimator. The code is written in assembly language for the Texas Instruments (TI) TMS320C5x digital signal processor ("DSP") platform.

Referring now to FIG. 2, for a system having a sample rate of $f_s$, and two possible interfering frequencies $f_a$ and $f_b$, the length in samples of one cycle of the interfering frequencies is $f_s/f_a$ and $f_s/f_b$ respectively. For $f_s$=9600 samples/second, $f_a$=50 Hz, and $f_b$=60 Hz (i.e., the two typical frequencies for power line interference), these wavelengths would be:

$$\frac{f_s}{f_a} = \frac{9600 \text{ samples/sec}}{50 \text{ Hz}} = 192 \text{ samples}$$

$$\frac{f_s}{f_b} = \frac{9600 \text{ samples/sec}}{60 \text{ Hz}} = 160 \text{ samples}.$$

The signal received by the modem is designated as x[k] where k is sample index. A sample index is a number used to identify a particular sample. If one uses a number in square brackets to denote the index, then the first sample is sample[0], the second sample is sample[1], and so on. By convention, it is common to have zero be the first index.

In order to determine which frequency is the source of the periodic interference, an autocorrelation method is used to identify the periodic characteristics of the received signal over time. The autocorrelation of the received signal x[k] is:

$$R_{xx}(m) = \sum_{k=0}^{K-1} x[k] \cdot x[k-m]$$

where K is the number of samples over which the autocorrelation is performed (i.e., from k=0 to K−1), and m is the offset. The optimum value for K is determined empirically. It has been determined that a value of K equal to the buffer length of 192 is sufficiently large to calculate $R_{xx}(m)$ with confidence. However, a value of K much less than 160 may not work well in calculating a reliable $R_{xx}(m)$ for comparison.

The incoming signal x[k] contains both the desired signal and the interference from the power line. As stated previously, the desired signal is assumed to be white in the absence of the interfering signal (i.e., the electronic signal is assumed random over time) or non-correlated to the interfering signal. Thus, the desired signal does not have to be gaussian white; it may simply be non-correlated to the power line noise. The interference, on the other hand, is assumed to be periodic so that the autocorrelation $R_{xx}(m)$ will be large when m is an integer multiple of the wavelength of the interference, and small when m is some other value. Thus, the interference is treated differently than the desired signal due to the periodic nature of the interference. The interference may be thought of as being treated as the primary signal and the desired signal as the background noise.

The frequency of the periodic interference may be determined or identified by comparing $R_{xx}(192)$ (which corresponds to 50 Hz) and $R_{xx}(160)$ (which corresponds to 60 Hz). The frequency corresponding to the larger autocorrelation is the frequency of the interference, i.e.:

$$f_{interference} = \begin{cases} f_a: \text{ if } --R_{xx}\left(\frac{f_s}{f_a}\right) > R_{xx}\left(\frac{f_s}{f_b}\right) \\ f_b: \text{ if } --R_{xx}\left(\frac{f_s}{f_b}\right) > R_{xx}\left(\frac{f_s}{f_a}\right) \end{cases}$$

In this manner, the periodic nature of the noise is analyzed differently than the non-periodic nature of the desired signal.

To illustrate this, consider a high speed modem which samples the incoming signal at 9600 samples/second as described above. Referring to FIG. 2, there is shown a block diagram of a frequency estimation system in accordance with a preferred embodiment of the present invention. The input, x[k] is coupled to a first buffer 117, a first multiplier 118 and a second multiplier 122. The first buffer 117 is coupled to a second buffer 120 and to the first multiplier 118. The second buffer 120 is connected to the second multiplier 122. Additionally, there is a first summation block 124 which is connected to the first multiplier 118 and supplies the output for $R_{xx}(160)$. There is also a second summation block 126 which is connected to the second multiplier 122 and supplies the output for $R_{xx}(192)$.

In this embodiment, received samples of the signal x[k] are stored in buffers until 192 samples have been collected, as shown in FIG. 2 There is a first delay buffer 117, which is large enough for 160 samples, and a second delay buffer 120, which is large enough for 32 samples. In addition to the delay buffers, there are two multiplication blocks 118, 122 and two addition blocks 124, 126. In this manner, for the next 160(K) samples, as each new sample is received (sample k), it is multiplied by samples k-160 and k-192, and the products are added to the $R_{xx}(160)$ and $R_{xx}(192)$ totals. Only two multiplication and summing steps are required per sample, which is much less complex than other spectral analysis approaches. Other operations, apart from correlation, that show how well the current samples match the delayed samples may be used.

Although the foregoing discussion is addressed to the case wherein the periodic signal is labeled as noise, the periodic signal may be any type of electronic signal. Moreover, the comparison is not limited to two discrete frequencies but rather to any number of discrete frequencies. For example, if a finite range of frequencies for the interference signal is known (e.g., 50 to 55 Hz), each of the frequencies (50, 51, 52, 53, 54, and 55 Hz) can be compared to determine which of the five discrete frequencies is closest to the frequency of the periodic signal.

In another preferred embodiment of the invention, an apparatus and method for canceling noise in an electronic signal is provided. The apparatus may be referred to herein as an interference estimator. A system that will cancel such interference under these circumstances is shown in FIGS. 3a and 3b.

The interference estimator does two things: it builds a model of the interference, and it provides samples of the model to be subtracted from the received signal that are in phase with and equal in amplitude to the interference component of the incoming signal. Source code for a preferred implementation of the interference estimator, written in DSP (assembly language) for the Texas Instruments (TI) TMS320C5x platform, is provided in Appendix B hereto.

Figure 3A:
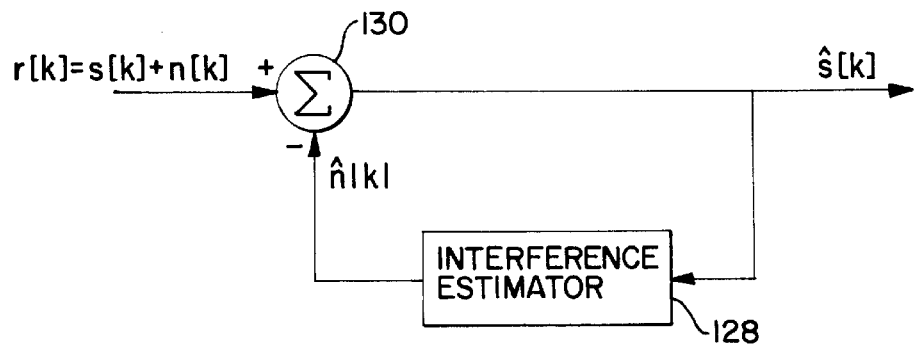
FIG. 3a is a block diagram of a periodic interference cancellation system in accordance with a preferred embodiment of the present invention, which system is operable in a feed-back mode.

To understand how the interference estimator cancels the interference, consider the feed-back system in FIG. 3a, wherein a buffer value is subtracted from the received sample, at the summation block 130, before being input into the interference estimator 128. The received signal r[k] consists of a desired signal, s[k], and periodic interference, n[k]. The received signal is input to a summation block 130 along with the output of the interference estimator, ñ[k]. In practice, ñ[k] is generated from the interference estimator 128, as described below, and is subtracted from r[k]. The output of the summation block is ŝ[k]. As described subsequently with respect to FIG. 4, the interference estimator 128 includes a model of the interference. Based on the model, the interference estimator subtracts ñ[k] (the model of the interference at sample k) from r[k] in order to generate ŝ[k].

Figure 3B:
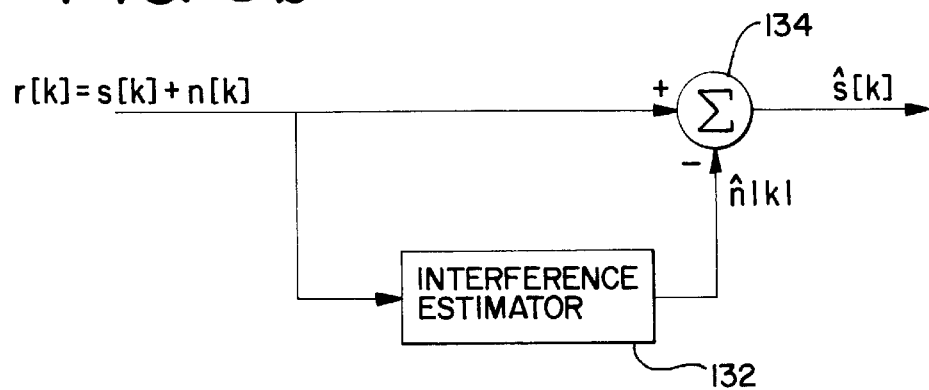
FIG. 3b is a block diagram of a periodic interference cancellation system, which system is operable in a feed-forward mode.

Referring to FIG. 3b, there is shown a block diagram of a periodic interference cancellation system, which system is operable in a feed-forward mode, in an alternative embodiment of the invention. In this embodiment, the input to the interference estimator 132 is r[k], which is also supplied to the summation block 134. The output to the interference estimator 132 is subtracted from r[k] at summation block 124 to form ŝ[k].

By way of example, the frequency of this interference is exactly 60 Hz and the sample rate of the system is 6000 samples/sec. A circular buffer (b[k]) is created to model the noise in the system in order to determine ñ[k], the actual model of the interference. For example, if interference model b[k] is perfectly in sync with the phase of the interference, which is described subsequently, b[k] represents ñ[k]. If the model is out of phase with the interference, b[k] is corrected through interpolation to determine ñ[k], the actual model of the interference.

Figure 4:
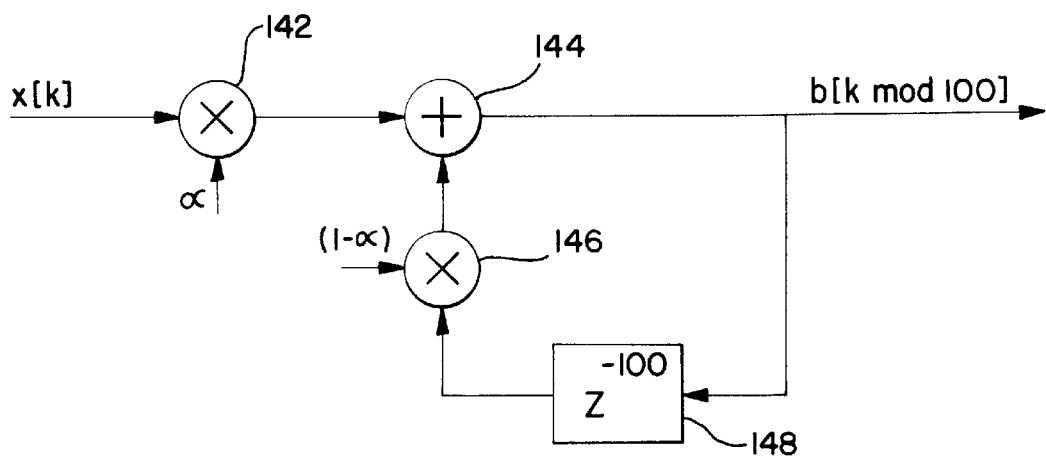
FIG. 4 is a block diagram of the signal integrator for generating the interference model, in accordance with a preferred embodiment of the present invention, for the interference estimator as shown in FIG. 3a or FIG. 3b.

Referring to FIG. 4, there is shown a block diagram of the signal integrator for generating the interference model b[k], in accordance with an embodiment of the present invention, for the interference estimator 128 as shown in FIG. 3a or the interference estimator 132 as shown in FIG. 3b. The signal x[k], which in the preferred embodiment is the received signal r[k], is input to a multiplication block 142 to be multiplied by a, a constant. The output of the multiplication block 142 and the output of a delay block 148 are input to a summation block 144. The delay block 148 delays whatever is input to the delay block for 100 samples in this example. The input to the second multiplication block 146 is the output of the delay block 148. The second multiplication block 146 multiplies the input by (1-α). The delay block 148 delays whatever is input to the delay block 148 for 100 samples in this example As shown in FIG. 4, the circular buffer delay block 148 is 100 samples in length. As discussed above, if, for example, the sample rate of the system is 6000 samples/sec and the frequency of interference is exactly 60 Hz, then an integer number of samples can represent one cycle at the fundamental frequency of the interference. If, on the other hand, the frequency of interference is 50 Hz and the sample rate is 8000 samples/sec, the circular buffer will not represent one cycle at the fundamental frequency. Thus, depending on the sample rate and the frequency of interference, the circular buffer may also contain a fraction of the fundamental frequency or more than one cycle of the fundamental frequency. If the circular buffer does not equal one cycle of the fundamental frequency, values are adjusted using interpolation or other methods, as described subsequently.

Received samples are scaled by some factor alpha ($0 \leq \alpha \leq 1$), described subsequently, and integrated into the buffer as follows:

$$b[0] = (1-\alpha) \cdot b[0] + \alpha \cdot x[k]$$
$$b[1] = (1-\alpha) \cdot b[1] + \alpha \cdot x[k+1]$$
$$* * *$$
$$b[99] = (1-\alpha) \cdot b[99] + \alpha \cdot x[k+99].$$

The buffer then wraps around in the next cycle and recalculates the buffer as follows:

$$b[0] = (1-\alpha) \cdot b[0] + \alpha \cdot x[k+100]$$

$$b[1] = (1-\alpha) \cdot b[1] + \alpha \cdot x[k+101]$$

Because the signal s[k] is uncorrelated with itself its contribution to the buffer will generally average to zero. The interference, on the other hand, is correlated at an interval equal to the length of the buffer (one cycle). Hence the buffer grows a model of one average cycle of the interference. Therefore, the interference is treated differently than the desired signal due to the correlated, periodic nature of the interference. And, the interference model treats the desired signal and the interference in the exact opposite manner as they are normally treated. Normally, it is the desired signal that is examined and the interference that is treated as background noise. However, the current interference model treats the interference as the primary signal for examination and the desired signal as background noise.

During the first time through the buffer (the first 100 received samples in this example), α=1 in a preferred embodiment. After the first time through the buffer, α can then be immediately set to a minimum value, or gradually reduced until it reaches the minimum value (e.g. letting α=1/(number of times through the buffer)). The larger the value of α, the faster the buffer changes to reflect recent changes in the interference. A smaller α, on the other hand, builds a better average. The amplitude in either case will be the same as the average amplitude of the interference.

Likewise, the buffer for the feed-forward system, as shown in FIG. 3b, is as follows:

$$b[k \bmod 100] = (1-\alpha)b[k \bmod 100] + \alpha \cdot x[k].$$

It has been assumed up to this point that that the frequency is fixed and that one interference cycle can be exactly represented by an integer number of samples; however, this may not always be the case. The frequency may drift, and the wavelength in samples may not be an integer number (as is the case where the circular buffer equals one cycle of the fundamental frequency). For example, while the average frequency for a power line may be 50 Hz or 60 Hz, the frequency varies over time by some degree. If this occurs, the received interference cycles will not "line up" as they are added into the buffer, and hence the buffer will not grow an average of the interference.

There are a couple of ways to handle this problem. In a preferred embodiment, the interference shift is monitored relative to the model, and then the received samples are interpolated in a manner such that one cycle will exactly fit into the buffer. Various methods, which are known in the art, may be utilized to perform the interpolation. In one embodiment, a linear interpolator provides sufficient estimation, and is shown for the model of the noise in the system, b[k] and for the actual model of the interference, ñ[k], in the following equations:

$$b[j] = b[j] + \alpha * \{a * x[k] + (1-a) * x[k-1]\}$$

$$\hat{n}[k] = a * b[j] + (1-a) * b[j-1]$$

where a is a number between 0 and 1 which indicates where to interpolate the samples between x[k] and x[k-1].

Figure 5:
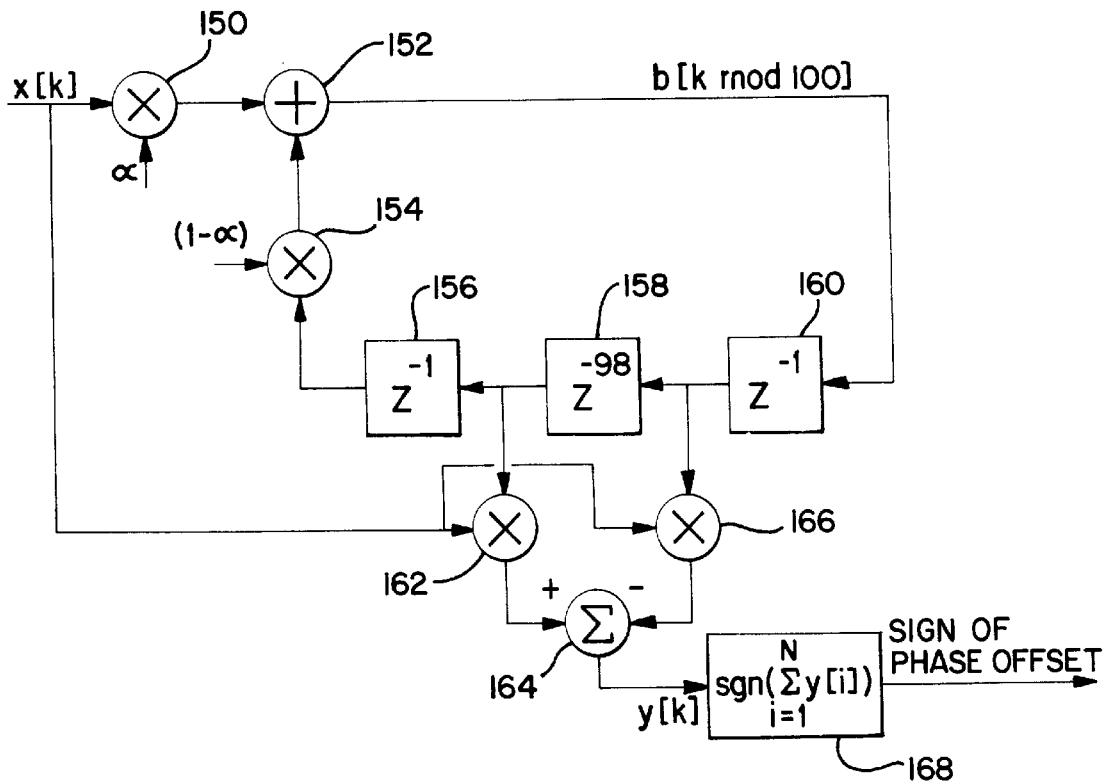
FIG. 5 is a block diagram for correlating the received signal with the interference model, as shown in FIG. 4, to determine phase offset.

Referring to FIG. 5, there is shown a block diagram for correlating the received signal with the interference model, as shown in FIG. 4, to determine phase offset. The signal x[k] is input to a multiplication block 150 which multiplies x[k] by α. The output of the multiplication block 150 is input to a summation block 152 along with the output of another multiplication block 154. The b[k] value output from summation block 152 is sent to three delay blocks 156, 158,160 in order to delay the output value by 1, 98, and 1 samples, respectively. Further, the outputs of delay blocks 158, 160 are sent to multiplication blocks 162, 166, respectively, along with the signal x[k]. The outputs of the multiplication blocks 162, 166 are sent to a summation block 164, after which the sign of the phase offset is determined at 168. As described more fully below, the output of multiplication block 162 is x[k]*b[j−1] and the output of multiplication block 166 is x[k]*b[j+1]. These values are subtracted at summation block 164 to determine the value y[k]. The values of y[k] are then summed and the sign is determined at block 168.

FIG. 5 determines whether the phase is leading or lagging. In practice, if the phase is leading, the value of a, as used in the equations above for b[j] and n̂[k], is increased by 0.1 (this value may be modified based on the design choice); if the phase is lagging, the value of a is decreased by 0.1. In this manner, if a is previously zero, and the phase is leading, a is increased to 0.1. If on the next pass, the phase is still leading, a is again increased by 0.1 to 0.2. However, there may be instances where a more sophisticated interpolation method, such as a LaGrange interpolator, may be required.

Based on the phase of the system, the actual interference may lead, lag or be in sync with the model. If the phase is in sync, linear interpolation is not required. If the actual interference leads or lags the model, two interpolations are necessary. The first interpolation is to determine the "actual" x[k] in order to update the buffer model, b[k], as described in the following equation: b[j]=b[j]+α*{a*x[k]+(1-a)*x[k−1]}. For example, if the interference is lagging behind the model, then the "actual" x[k] is really in between x[k] and x[k−1]. Based on the amount of lag in the system, the "actual" x[k] is determined (which may then be used to update the interference model).

The second interpolation is to determine the "actual" b[j] in order to determine n̂[k], as described by the following equation: n̂[k]=a*b[j]+(1-a)*b[j−1]. Similar to calculating the "actual" x[k], n̂[k] is modified based on whether the model is leading or lagging the interference.

In an alternative embodiment, the length of the buffer is made as close as possible to a length that represents an integer number of cycles. For example, if the sample rate is 8000 samples/second, a buffer length of 400 will exactly hold 3 cycles at exactly 60 Hz. Then, proceeding as described above, the system is monitored to determine if the received interference is drifting in phase relative to the model in the buffer. If the interference drifts by more than ½ of a sample, or ½ of whatever fraction of a sample the buffer can be broken down into, the buffer indices of the samples, into which the received samples are integrated, are shifted to put the received interference back in phase with the model. In practice, the pointer which addresses the specific entries within the buffer is incremented or decremented. Alternatively, the actual values in the buffer may be physically shifted to an adjacent buffer location (i.e. each of the buffer samples moved left or right) in order to effect the shift in buffer samples. (When more than one cycle is required to create a proper buffer, the different cycles in the buffer are out of phase with each other relative to the sample time by some fraction of a sample. Hence the precision to which one can identify a point on the model is that fraction.) In practice, the shifting of the indices is less accurate than the interpolation method described above.

In both of these cases (the interpolation and shifting methods), it is necessary to detect a shift of the interference phase relative to the model. This can be done by correlating the received interference with the model at various offsets. In the preferred embodiment, the offset is plus and minus one sample. The correlation value, φ(n), where n is the offset, is then $$\phi(1)=\Sigma x[k] \cdot b[j+1],$$

$$\phi(-1)=\Sigma x[k] \cdot b[j-1],$$

where x[k] is the current input sample to the estimator, b[j] is the current buffer sample, and the summation is over some number of input samples, the exact number of which is determined empirically. Preferably the summation is over 16 samples; however other numbers of samples, such as 8 or 32 samples may also be used. Therefore, the correlation shows how well the shifted model and the input signal are lined up in phase. Other operations, apart from correlation, that show how well the shifted model and the input signal are lined up in phase [or lined up with respect to another variable such as time] may be used.

The b[j] values are delayed using delay blocks of 1 and the buffer length−1, as shown by delay blocks 158, 160 (in the example shown in FIG. 5, the buffer length is 100). The b[j] values are then multiplied and summed to determine the sign of the offset. In FIG. 5, y[k] is calculated by subtracting x[k]·b[j+1] from x[k]·b[j−1], summed and the sign of the sum is determine. This is the same type of calculation as determining φ(1), which is the summation of x[k]·b[j+1], and φ(−1), which is the summation of x[k]·b[j−1], and comparing the two values φ(1) and φ(−1) to determine which one is larger.

If φ(1)>φ(−1), then the interference phase is lagging behind the model. If φ(1)<φ(−1), then the interference leads the model. If they are equal, then the interference is in phase with the model. In other words, FIG. 5 compares the buffer values with the incoming signal to determine if the phase is leading or lagging. The buffer is shifted forward for b[j+1] and correlated with x[k]. This value is φ(1). The buffer is also shifted backward for b[j−1] and correlated with x[k]. This value is φ(−1). φ(1) and φ(−1) therefore represent numbers to determine how well the buffer, whether b[j+1] or b[j−1] correlates. Based on the comparison of the two numbers, it may be determined whether the phase is leading or lagging.

In an alternative embodiment, one may calculate different offsets. For example, one may calculate φ(2) and φ(−2) if the phase is shifting quickly.

Generally, $$\phi(n)=\Sigma x[k] \cdot b[j+n]$$

for a different offset.

If the shifting method described above is used, it is useful to obtain a zero offset correlation value:

$$\phi(0)=\Sigma x[k] \cdot b[j],$$

so that if φ(1)>φ(0) the buffer index is advanced, if φ(−1) >φ(0) the buffer index is decremented, and if φ(0)>φ(1) & φ(0)>φ(−1) the buffer index is unchanged.

The final interference estimate sample to be subtracted from the next received sample is obtained by simply reading one sample ahead of the current buffer sample, if the shifting method is used. If the interpolation method is used, then another interpolation to calculate the "actual" b[j], as described above, must be done to obtain the estimate.

As discussed previously, in order to correct the phase of the system for the next sample, the model is adjusted based on whether the interference is lagging or leading the model. For example, if the interference is leading the model, the buffer is adjusted upward by 0.1 of a sample (this value may be modified based on the design choice); therefore, if on the next pass, the interference is still leading the model, the buffer is adjusted slightly upward again. Likewise, if the interference is lagging the model, the buffer is adjusted downward by 0.1 of a sample. This comprises a classical first order phase-locked loop. A classical second order phase-locked loop structure is implemented according to common practice in the code in Appendix B.

Figure 6A:
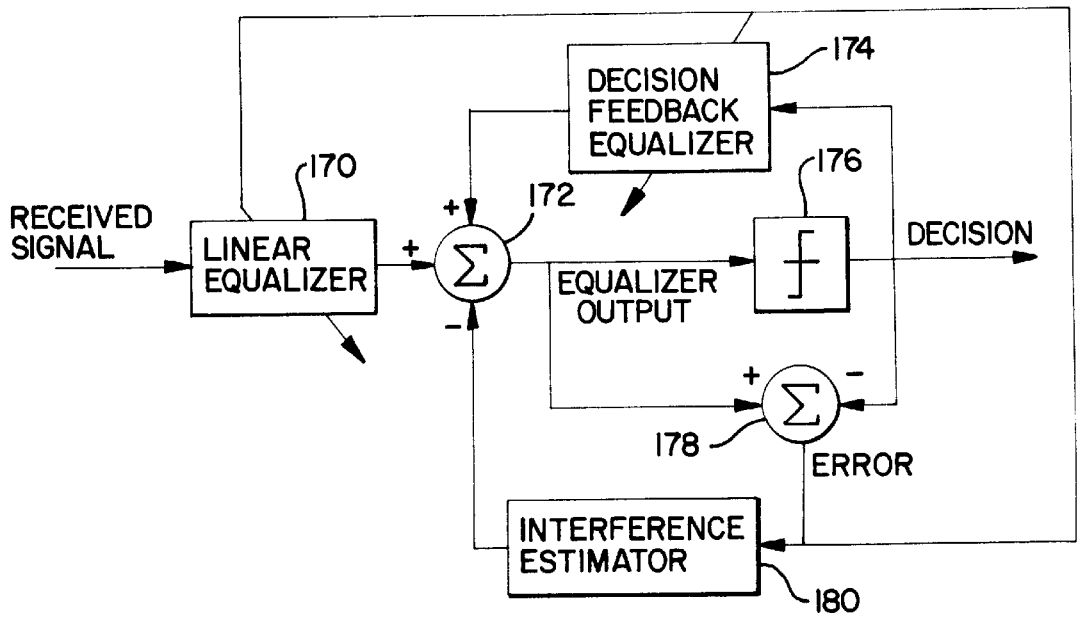
FIG. 6a is a block diagram of the interference canceller in the equalizer system of a pulse code modulated (PCM) modem.

As indicated above, high speed modems are often subjected to periodic interference, or "hum." This interference can cause a degradation of performance by creating decision errors in same manner of other forms of additive noise. To reduce the effects of this interference in any modem, and in particular to a pulse code modulation (PCM) modem, the interference canceller can be advantageously placed in the equalizer system as shown in FIG. 6a.

The received signal and the error term are input to a linear equalizer 170. The outputs of the linear equalizer 170, a decision feedback equalizer 174 and the interference estimator 180 are sent to a summation block 172. The output of the summation block is sent both to a decision block 176 and to another summation block 178. The output of the decision block 176 is also coupled to decision feedback equalizer 174.

An error term is generated at summation block 178, which error term is the difference between the equalizer output and the decision made on that output. The error term also is input to the decision feedback equalizer 174 and the linear equalizer 170. This error term, then, is used as the input to the interference estimator 180. The output of the interference estimator 180 is subtracted from the equalizer output at summation block 172.

When the line conditions are reasonably good, the error term will consist mostly of the periodic interference. The signal which is input to the interference estimator 180 is predominantly the noise signal so that the interference estimator 180 more quickly and accurately models the noise in the system. Signals that were input to the interference estimator in FIG. 4 were predominantly the desired signal with an additional noise signal. In those instances, since the noise signal was not predominant, more iterations are required to build the model for the interference estimator in order for the predominant desired signal to "average out" of the model. Regardless, any signal may be input to the interference estimator, as long as the signal includes the periodic noise.

Figure 6B:
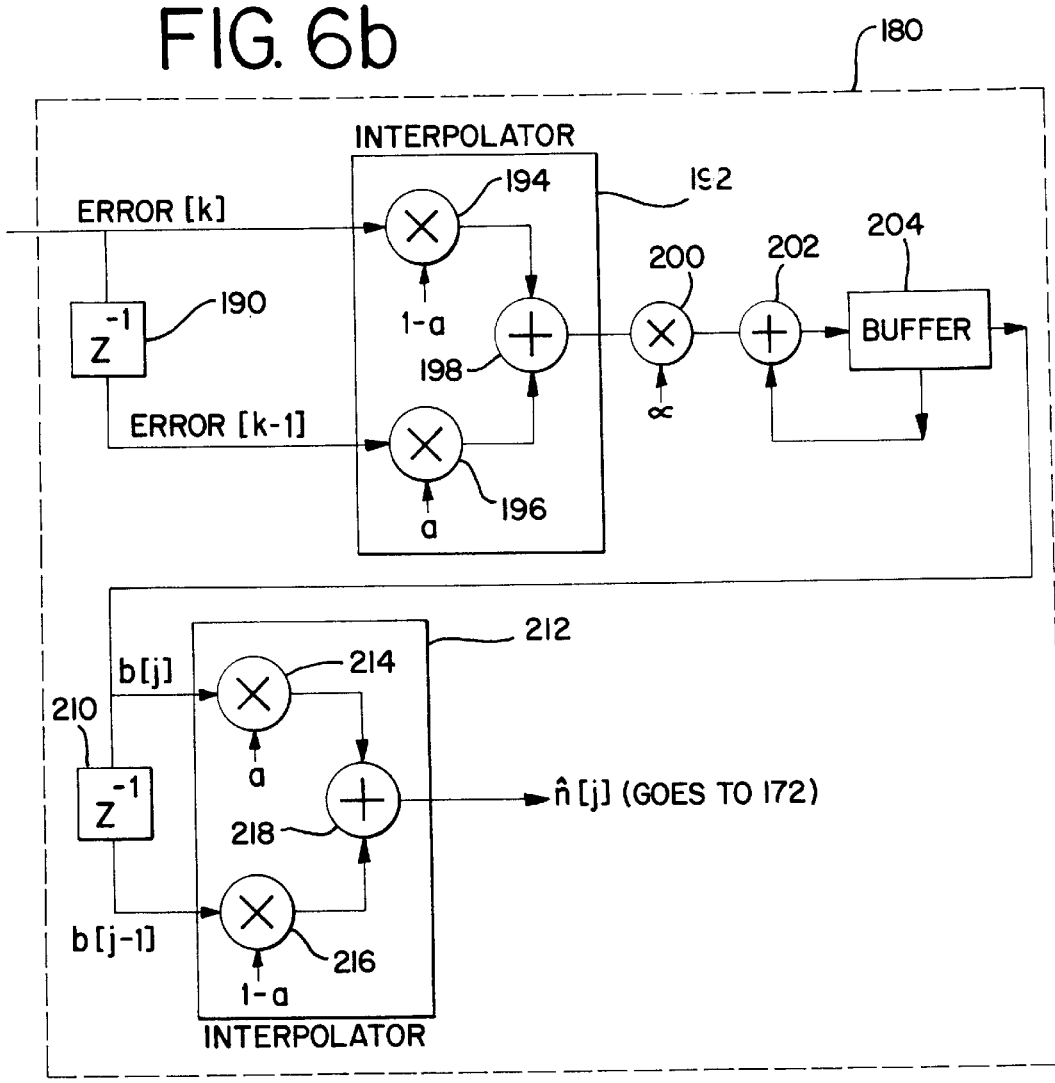

Referring to FIG. 6b, there is shown a block diagram of the interference estimator as shown in FIG. 6a. The input waveform has a certain number of samples which defines one cycle of the waveform. According to one embodiment of the invention, the buffer, b[k], may be used to express that input waveform. The number of entries in the buffer b[k] can be set to any number, depending on the necessary accuracy for the interference cancellation. For example, the number of entries in the buffer may be an integer number for one cycle of the waveform (e.g., 100 samples for one cycle). Or, the number of entries in the buffer may result in a fraction of a number of samples for each cycle (e.g., 133⅓ samples for one cycle) for multi-cycle buffers. Because of interpolation, the number of samples for one cycle of the waveform need not be an integer number to define the waveform.

Referring to FIG. 6b, there is shown an error term, error[k]. This is the same term as shown in the output of the summation block 178 in FIG. 6a. As described previously, the interpolation equations for b[j] and n̂[k] are the following: b[j]=b[j]+α*{a*x[k]+(1-a)*x[k−1]}; n̂[k]=a*b[j]+(1-a)*b[j−1]. The error[k] value corresponds to x[k] value in the previous equation.

To calculate the b[j], error[k], and error[k−1], which is delayed by delay block 190, are input to a first interpolator 192. The first interpolator 192 includes two multiplication blocks 194, 196 and an addition block 198 and calculates the value of error[k]*(1-a)+error[k−1]*a. This value is input to multiplication block 200, and is multiplied by α. Block 204, which contains the buffer values, supplies b[j] at one output, which is input to the summation block 202. The output of the summation block 202 is then input to block 204 in order to update the buffer. Therefore, the value of b[j] is calculated using the equation b[j]+α*{a*x[k]+(1-a)*x[k−1]}.

In order to calculate n̂[k], the output of block 204 is b[j]. Delay block 210 delays the output so that its output is b[j−1]. The two inputs, b[j] and b[j−1], are input to the second interpolator 212. b[j] is sent to multiplication block 214 and multiplied by a. b[j−1] is sent to multiplication block 216 and multiplied by 1-a. The two outputs are summed at summation block 218. The output, according to the equation outlined above is n̂[k], which is sent to summation block 172, as shown in FIG. 6a.

The interference estimator 180 functions as described above with reference to FIGS. 3 through 5. However, as shown in FIG. 6b, there is no multiplication block 146 in order to multiply by (1-α), as was done in FIG. 4. The input to the delay block, as shown in FIG. 6a, is the error term. When first canceling the interference, the error term is large since the model has not had enough time to become an accurate model of the noise. As time passes, however, the model becomes more accurate. Because of this, the error term, which is the output of summation block 178, becomes smaller. Therefore, because the error term, which is input to the interference model, becomes smaller, there is no need to scale the output by 1-α.

Figure 7:
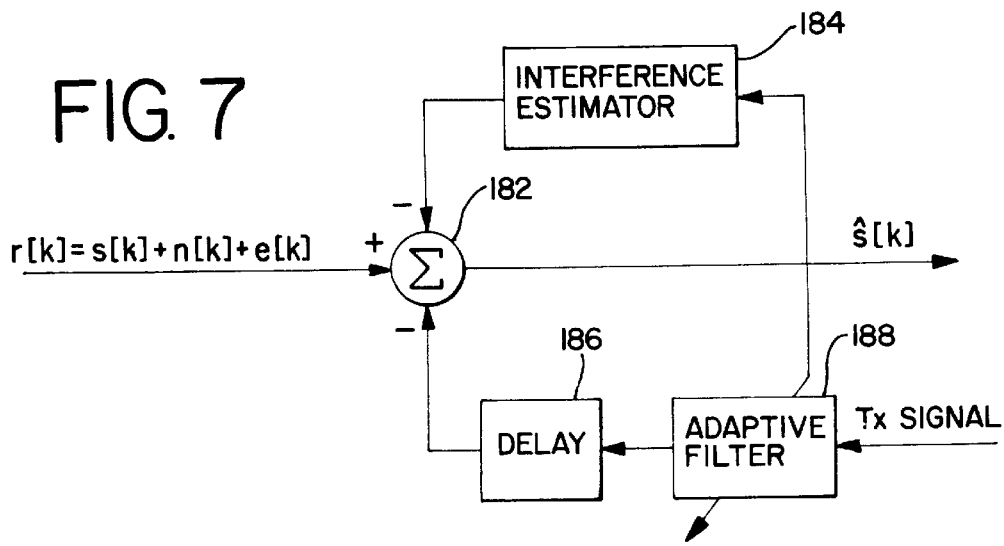
FIG. 7 is a block diagram of the interference canceller for a communication modem operating during echo canceller training.

In addition to corrupting data received by a high-speed modem, periodic interference may also prevent a modem's echo canceller from converging properly. During the echo canceller training phase, a modem requires that the only signal present on the phone line is echo from its own transmitted signal. If the echo canceller does not converge correctly due to hum on the line, performance is impaired. In this case, the periodic interference canceller can be used to subtract the hum from the received signal before the echo canceller, as shown in FIG. 7, receives it. The interference estimator 184, similar to FIG. 6b, generates n̂[k] in order to cancel the noise within the system. Moreover, the adaptive filter 188 and delay 186 further generate ê[k] so that the output of the system is ŝ[k]. In a preferred embodiment, the interference is estimated and subtracted from the echo canceller during training mode. There may be two interference estimators, one for echo cancelling as shown in FIG. 7 and one for the data mode as shown in FIG. 6a.

It is intended that the foregoing detailed description be regarded as illustrative rather than limiting and that it is understood that the following claims, including all equivalents, are intended to define the scope of the invention.

Appendix A

* To determine the frequency of the periodic interface, if there is any,
* the buffer is first filled with arc_err_0 samples (Stage 0). The error
* signal can then be autocorrelated at an offset of one 60 Hz cycle and
* one 50 Hz cycle (Stage 1). The frequency of the periodic interferences,
* if any, will correspond to the larger correlation value.
* Stage 0: load the buffer -continued

Appendix A

```
        lacl      h_stage              ; check flag: this stage or next one?
        bcnd      h_ec_stage1,NEQ
        lar       ar0,#humbufstart+h_ec_long
        cmpr      0                    ; equal ? (Stored one full cycle?) True:TC=1 False:TC=0
        bcnd      save_sample, NTC
        splk      #humbufstart,hum_ptr
        lar       ar1,hum_ptr
        add       #1                   ; set flag to start next stage
        sacl      h_stage
        b         h_ec_stage1
save_sample
        lacl      h_err_0
        sacl      *+                   ; store error in buffer, increment buffer index
        sar       ar1,hum_ptr          ; save new index
        b         end_ec_humbucker
h_ec_stage1            ;Stage 1:Correlate new received samples with samples in buffer
        sub       #1                   ; check flag: this stage or next one?
        bcnd      start_ec_humbucker,NEQ
        lar       ar0,#humbufstart+h_ec_short
        cmpr      0                    ; equal ? (Correlated one full cycle?) True:TC=1 False:TC=0
        bcnd      correlate_err,NTC
        splk      #humbufstart,hum_ptr ; reset pointer
        add       #2
        sacl      h_stage              ; set flag to start next stage
*       make 50/60/nohum decision
        lar       ar1,#arcflg
        ap1       #ahumbuck,*          ; humbuck flag off
        splk      #humbufstart+160,h_ec_len    ; set 60 Hz buffer length
        splk      #humbufstart+133,h_len
        lacc      hc_50h,16
        adds      hc_50l
        sacb
        lacc      hc_60h,16
        adds      hc_60l
        crgt                           ; 60 Hz correlation > 50 Hz correlation?
        bcnd      check_hum_threshold,C ; If not, don't change buffer length.
        splk      #humbufstart+192,h_ec_len    ; Otherwise, set 50 Hz buffer length.
        splk      #humbufstart+160,h_len
check_hum_threshold
        lacc      #hum_threshold,15
        crgt                           ; Is there a hum?
        bcnd      end_ec_humbucker,C   ; If not, skip humbucker, and don't change
*                                        humbuck flag
        opl       #ohumbuck,*          ; Otherwise, set hum on flag.
        lacl      #0                   ; and initialize the humbucker
        sacl      hum
        sacl      h_vcol
        splk      #H_ALPHAH,h_alpha
        splk      #HC_LEN,hum_cnt
        b         start_ec_humbucker
correlate_err
        spm       0
        lar       ar0,#h_ec_long-h_ec_short
        lt        h_err_0
        mpy       *0+
        lacc      hc_50h,16
        adds      hc_50l
        mpya      *0-                  ; 50 Hz correlation
        sach      hc_50h
        sacl      hc_50l
        lacc      hc_60h,16
        adds      hc_60l
        apac
        sach      hc_60h               ; 60 Hz correlation
        sacl      hc_60l
        lacl      #0
        sacl      *+                   ; zero buffer, increment pointer
        sar       ar1,hum_ptr
        spm       1
        b         end_ec_humbucker
start_ec_humbucker
*
*       Code in Appendix B, goes here.
*
        end_ec_humbucker
```

Appendix B

```
*       - Cancels periodic interference
        mar     *,ar1
        lar     arl,#arcflg
        bit     *,fhumbuck              ; Is there any hum?
        bcnd    end_humbucker,NTC       ; If not, skip the humbucker
        lacl    arc_err_0
        ldp     #4
        dmov    h_err_0                 ; h_err_1 = h_err_0
        sacl    h_err_0                 ; h_err_0 = receiver sample
        lar     arl,hum_ptr
        lacl    nsphs                   ; nsphs = number (of equalizer output)
*                                         samples per hum sample
        sub     #1                      ; decrement nsphs
        sacl    nsphs
        bcnd    calculate_h_est,NEQ
test_hum_ptr
        lar     ar0,h_len
        cmpr    0                       ; hum_ptr=(end of buffer)+1 ? True:TC=1 False:TC=0
        bcnd    interpolate_error,NTC
        rpt     #2
        bldd    #humbufstart,*+         ; copy the first three buffer
*                                         samples to the end of the buffer
        lar     arl,#humbufstart        ;Pointer back to the beginning of the
*                                         buffer
        lacc    #h_gamma_min, 15
        sacb
        lacc    h_gamma,15
        sub     h_gamma,12              ; exponential gamma reduction
        crgt                            ; Reduced gamma larger than min gamma?
        bcnd    interpolate_error,NC ; If not, don't save the reduced value
        sach    h_gamma,1               ; Otherwise, save it
interpolate_error
        lacl    hum                     ; old hum
        sacl    h_tempx
        lt      h_tap1
        mpy     h_err_0
        pac
        lt      h_tap2
        mpy     h_err_1
        apac                            ; hum = h_err_0*h_tap1 + h_err_1*h_tap2
        add     h_one,14                ; correct for truncation
        sach    hum,1                   ; interpolated error term
        lar     ar0,#2
        lt      hum
        mpy     *0+                     ; hum(t+0)*humbuffer(t-1)
        lacc    hc,1
        mpya    *0-                     ; hum(t+0)*humbuffer(t+1)
        lts     h_tempx                 ; tempx=old hum
        bsar    1                       ; correct for shift in accumulation steps above,
since pm=1
        sacl    hc                      ; cross-correlation
*                                         hum(t+0)*humbuffer(t-1)-hum(t+0)*humbuffer(t+1)
        lacc    *,15
        mpy     h_gamma
        apac                            ; acca=humbuffer + old hum * gamma
        add     h_one,14
        sach    *+,1                    ; store old interpolated error term in humbuffer
        sar     arl,hum_ptr             ; store incremented pointer value
update_h_vco
        lt      h_int2
        mpy     #h_beta2                ; scale second order integrator output
        pac
        add     h_vcoh,16               ; make timing adjustment
        adds    h_vcol
        sach    h_vcoh
        sacl    h_vcol
        lacl    h_gamma                 ; don't make loop corrections if the
        bcnd    update_h_time,EQ        ; humbucker is off
        lacc    hum_cnt                 ; integrate/dump period over?
        sub     #1
        sacl    hum_cnt
        bcnd    update_h_time,NEQ ; no, continue integration
        splk    #HC_LEN,hum_cnt         ; yes, reload counter
        bit     hc,b15                  ; slice correlation difference
        sacl    hc                      ; zero correlators
        lacc    h_beta1,16              ; hum loop á1
        xc      l,tc
        neg
```

-continued

Appendix B

```
        setc    ovm                     ; update second order integrator
        add     h_int2,16               ; with ñ h_beta1
        sach    h_int2
        clrc    ovm
        lacc    h_alpha                 ; hum loop à
        xc      1,tc
        neg
        add     h_vcoh                  ; make first order correction
update_h_time
        splk    #0,h_vcoh               ; (zero the correction)
        adds    h_time                  ; make the correction, acch = -1,0,1
        sacl    h_time
        add     #10h,12                 ; calc # samples required for next baud
        sach    nsphs                   ; nsphs = 0,1,2
        lacl    h_time                  ; h_time is between 0 and 65535
        add     h_one,1
        bsar    2                       ; h_tap1 is between 0 and 16383
        sacl    h_tap1
        lacc    h_one,14
        sub     h_tap1
        sacl    h_tap2                  ; h_tap2 = 16384-h_tap1
        lacl    nsphs
        bcnd    test_hum_ptr,EQ         ; Do all this again if nsphs = 0
calculate_h_est
        lacl    h_gamma
        bcnd    end_humbucker,EQ ;Don't modify equalizer output if h_gamma=0
        lacl    #2
        sub     nsphs
        sacl    h_tempx                 ; h_tempx = how many samples ahead in buffer to
*                                         get estimate
        lar     ar0,h_tempx
        mar     #0+
        lt      h_tap1
        mpy     *+
        pac
        lt      h_tap2
        mpy     *
        apac                            ; interpolated hum estimate
        add     h_one,14
        neg
        ldp     #6
        add     eq_outp,15              ; subtract hum estimate from equalizer output
        sach    eq_outp,1
end_humbucker
```

We claim:

1. In a data communication device having a sampling rate and having an electronic signal containing a periodic signal, the periodic signal having a fundamental frequency, an interference estimator apparatus for modeling the periodic signal, the interference estimator apparatus comprising in combination:

means for scaling the electronic signal with a scaled factor;

circular buffer containing entries corresponding to at least one cycle of the fundamental frequency;

delay means for delaying the circular buffer entries an integer number of cycles of the fundamental frequency of the periodic signal; and means for adding the delayed circular buffer entries to the scaled electronic signal to update the circular buffer entries.

2. An interference estimator apparatus for modeling the periodic signal as claimed in claim 1 further comprising means for scaling the delayed circular buffer entries by a second scaled number.

3. An interference estimator apparatus for modeling the periodic signal as claimed in claim 2 wherein the means for scaling the electronic signal with a scaled factor includes multiplying the electronic signal by a variable $\alpha$ and wherein the means for scaling the delayed circular buffer entries by a second scaled number includes multiplying the delayed circular buffer entries by a variable $(1-\alpha)$.

4. An interference estimator apparatus for modeling the periodic signal as claimed in claim 1 wherein the number of entries in the circular buffer equals the sampling rate divided by the fundamental frequency.

5. In a data communication device having a sampling rate and having an electronic signal containing a periodic noise signal and an non-correlated desired signal, the periodic noise signal having a fundamental frequency, an interference estimator apparatus for modeling the periodic signal, the interference estimator apparatus comprising in combination:

buffer containing entries of estimates of the periodic noise signal at discrete points within the fundamental frequency;

means for scaling the electronic signal with a scaled factor ($\alpha$);

means for calculating updated buffer entries to replace previously determined buffer entries; and means for delaying and scaling the buffer entries so that the buffer entries are delayed for a predetermined amount of time and so that the buffer entries are scaled by $(1-\alpha)$, the means for delaying and scaling connecting the buffer in feedback with the means for calculating updated buffer entries, wherein the means for calculating updated buffer entries is based on the output of the means for delaying and scaling and the means for scaling the electronic signal.

6. An interference estimator apparatus for modeling the periodic signal as claimed in claim 5 further comprising means for determining whether the buffer entries lag, lead or are in sync with the phase of the periodic noise.

7. An interference estimator apparatus for modeling the periodic signal as claimed in claim 6 wherein the means for determining includes means for correlating a signal with periodic noise with the buffer entries at different offsets.

8. An interference estimator apparatus for modeling the periodic signal as claimed in claim 7 wherein the means for correlating includes calculating the following:

$$\phi(1)=\Sigma x[k]\cdot b[j+1],$$
$$\phi(-1)=\Sigma x[k]\cdot b[j-1],$$

where x[k] is the current electronic signal, b[j] is the current buffer sample, and the summation is over a predetermined number of samples.

9. An interference estimator apparatus for modeling the periodic signal as claimed in claim 6 further comprising means for adjusting the buffer entries to be in phase with the phase of the periodic noise.

10. An interference estimator apparatus for modeling the periodic signal as claimed in claim 9 wherein the means for adjusting the buffer includes means for interpolating the buffer entries.

11. An interference estimator apparatus for modeling the periodic signal as claimed in claim 9 wherein the means for adjusting the buffer includes means for shifting the entries in the buffer when the buffer entries lag or lead the phase of the periodic noise.

12. An interference estimator apparatus for modeling the periodic signal as claimed in claim 9 wherein the means for adjusting the buffer includes a pointer whereby the pointer is moved based on whether the buffer entries lag or lead the phase of the periodic noise.

13. An interference estimator apparatus for modeling the periodic signal as claimed in claim 5 wherein the number of entries in the buffer equals the sampling rate divided by the fundamental frequency.

14. A method for modeling periodic noise within an electronic signal, the method comprising the steps of:
selecting a frequency for the periodic noise;
creating a circular buffer having entries;
scaling the electronic signal with a scaled factor;
delaying the entries in the circular buffer for an integer number of cycles of the frequency of the periodic noise;
adding the delayed entries to the scaled electronic signal; and
replacing the entry in the circular buffer with the addition of the delayed entries with the scaled electronic signal.

15. A method for modeling periodic noise as claimed in claim 14 further comprising scaling the entries in the circular buffer with a second scaled factor and wherein the first scaled factor is $\alpha$ and the second scaled factor is $(1-\alpha)$.

16. A method for modeling periodic noise as claimed in claim 15 wherein the set of steps of scaling the electronic signal, delaying the entries in the circular buffer, scaling the entries in the circular buffer, adding the delayed entries to the scaled electronic signal, and replacing the entry in the circular buffer are repeatedly performed and wherein during the first execution of the set of steps, $\alpha$ is equal to 1.

17. A method for modeling periodic noise as claimed in claim 16 wherein for successive execution of the set of steps, $\alpha$ is equal to 1 divided by the number of times the set of steps is executed.

18. A method for modeling periodic noise as claimed in claim 14 further comprising the step of:
determining whether the circular buffer lags, leads or is in sync with the periodic noise.

19. A method for modeling periodic noise as claimed in claim 18 wherein the step of determining whether the circular buffer lags, leads or is in sync with the periodic noise includes correlating the periodic noise with the buffer entries at different offsets.

20. A method for modeling periodic noise as claimed in claim 19 further comprising the step of interpolating the electronic signals when the circular buffer lags or leads the periodic noise.

21. A method for modeling periodic noise in an electronic signal, the electronic signal also including a non-correlated desired signal, the method comprising the steps of:
creating a circular buffer having entries;
iteratively filling the circular buffer entries with values based on scaled samples of the electronic signal at points within the cycle of the fundamental frequency for the periodic noise and based on scaled delayed circular buffer entries, thereby treating the desired signal as background noise by averaging out the desired signal from the values entered in the circular buffer.

22. A method for modeling periodic noise in an electronic signal as claimed in claim 21 wherein the samples are scaled by a variable $\alpha$, wherein $\alpha$ is initially equal to 1.

23. A method for determining a periodic signal, the periodic signal and a random signal are included in an electronic signal, the method comprising the steps of:
estimating a frequency characterizing the periodic signal, the frequency having a corresponding period;
sampling the electronic signal for a predetermined number of times during the period corresponding to the frequency;
repeating the sampling step for a predetermined number of consecutive periods; and
applying an averaging function to the samples of the electronic signal taken at each predetermined time during the period so that the random signal averages out and the periodic signal is retained.

24. A method as claimed in claim 23 further comprising the step of:
determining whether a circular buffer lags, leads or is in sync with the periodic noise, whereby a signal containing the periodic noise is correlated with the buffer entries at different offsets.

25. A method as claimed in claim 24 further comprising the step of applying the model to the electronic signal, thereby reducing the periodic signal in the electronic signal.

26. A method of canceling periodic interference in a random electronic signal, comprising the steps of:
estimating a period associated with a frequency of the periodic interference;
sampling the electronic signal at predetermined times over a predetermined number of periods;
summing the samples for each predetermined time, thereby separating the periodic interference from the random electronic signal;
modeling the periodic interference based upon the sum; and
applying the model to the electronic signal,
wherein the step of applying the model comprises subtracting a value associated with the model of the periodic interference from samples of the electronic signal.

27. In a modem connected to a telephone network, an equalizer system for reducing periodic noise having a frequency comprising:

a linear equalizer, the linear equalizer having as one input a received signal;

a first summation block, the summation block connected to the linear equalizer;

a decision block, the output of the first summation block being input to the decision block;

a second summation block, the output of which is an error term, the output of the first summation block and the output of the decision block being input to the second summation block, the error term being a subtraction of the output of the decision block from the output of the first summation block, the error term also being input to the linear equalizer;

a decision feedback equalizer, the output of the decision block being input to the decision feedback equalizer, the output of the second summation block being input to the decision feedback equalizer, the output of the decision feedback equalizer being input to the first summation block;

an interference estimator, the output of the second summation block being input to the interference estimator, the output of the interference estimator being input to the first summation block wherein the interference estimator output is subtracted from the addition of linear equalizer output and the decision feedback equalizer output and wherein the interference estimator comprises:

multiplier for scaling the error term input with a scaled factor;

circular buffer containing entries corresponding to at least one cycle of the frequency of the periodic noise;

delay means for delaying the circular buffer entries an integer number of cycles of the frequency of the periodic signal; and means for adding the delayed circular buffer entries to the scaled error term to update the circular buffer entries.

28. An equalizer system as claimed in claim 27 wherein the interference estimator further comprises:

a first interpolator, the first interpolator having as an input the error term, the output of the first interpolator being input to the multiplier; and a second interpolator, the second interpolator having as an input the circular buffer, the output of the second interpolator being input to the first summation block.

29. In a modem connected to a telephone network, an echo canceling system for reducing the signal associated with periodic noise having a frequency, the echo canceling system comprising:

a summation block;

an electronic signal input to the summation block;

an interference estimator, the output of the summation block being input to the interference estimator, the output of the interference estimator being input to the summation block;

an adaptive filter, the adaptive filter having as inputs the output of the summation block and the transmitted signal;

a delay block, the delay block having as an input the adaptive filter, wherein the output of the delay block and interference estimator is subtracted from the electronic signal and wherein the interference estimator comprises:

multiplier for scaling the input to the interference estimator with a scaled factor;

circular buffer containing entries corresponding to at least one cycle of the frequency of the periodic noise;

delay means for delaying the circular buffer entries an integer number of cycles of the frequency of the periodic signal; and means for adding the delayed circular buffer entries to the scaled input to the interference estimator to update the circular buffer entries.

30. An equalizer system as claimed in claim 29 wherein the interference estimator further comprises:

a first interpolator, the first interpolator having as an input the input to the interference estimator, the output of the first interpolator being input to the multiplier; and a second interpolator, the second interpolator having as an input the circular buffer, the output of the second interpolator being input to the summation block.

31. In a modem connected to a telephone network, a method for reducing periodic noise in an equalizer system, the equalizer system having a linear equalizer with inputs of an error term and a received signal, a decision feedback equalizer, a decision block, and an interference estimator, the output of the decision block being input to the decision feedback equalizer, the method comprising:

obtaining an equalizer output by summing the linear equalizer output and the decision feedback output, and by subtracting the output of the interference estimator;

obtaining the error term by subtracting the output of the decision block from the input of the decision block; and determining the output of the interference estimator based on the error term.

32. A method for reducing periodic noise in an equalizer system as claimed in claim 31, the step of determining the output of the interference estimator based on the error term comprising the steps of:

selecting a frequency for the periodic noise;

creating a circular buffer having entries;

delaying the entries in the circular buffer for an integer number of cycles of the frequency of the periodic noise;

adding the delayed entries to the error term; and replacing the entry in the circular buffer with the addition of the delayed entries with the error term.

* * * * *